United States Patent
Du et al.

(10) Patent No.: US 11,223,806 B2
(45) Date of Patent: Jan. 11, 2022

(54) LIGHT SOURCE SYSTEM, METHOD FOR IMPROVING LIGHT EFFICIENCY THEREOF, AND DISPLAY DEVICE

(71) Applicant: APPOTRONICS CORPORATION LIMITED, Guangdong (CN)

(72) Inventors: Peng Du, Shenzhen (CN); Ning Lu, Shenzhen (CN); Zuqiang Guo, Shenzhen (CN); Yi Li, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 0 days.

(21) Appl. No.: 17/272,902

(22) PCT Filed: Apr. 8, 2019

(86) PCT No.: PCT/CN2019/081647
§ 371 (c)(1),
(2) Date: Mar. 2, 2021

(87) PCT Pub. No.: WO2020/048123
PCT Pub. Date: Mar. 12, 2020

(65) Prior Publication Data
US 2021/0218937 A1    Jul. 15, 2021

(30) Foreign Application Priority Data
Sep. 3, 2018 (CN) .......................... 201811020709.2

(51) Int. Cl.
*H04N 9/31* (2006.01)

(52) U.S. Cl.
CPC ........... *H04N 9/317* (2013.01); *H04N 9/3158* (2013.01)

(58) Field of Classification Search
CPC ...... H04N 9/3155; H04N 9/31; H04N 9/3164; H04N 9/3158; H04N 9/3161; H04N 9/317;
(Continued)

(56) References Cited

U.S. PATENT DOCUMENTS

| 2013/0050981 A1 | 2/2013 | Yang et al. |
| 2020/0272039 A1* | 8/2020 | Guo ...................... G03B 21/208 |

(Continued)

FOREIGN PATENT DOCUMENTS

| CN | 104111532 | 10/2014 |
| CN | 105204278 | 12/2015 |

(Continued)

OTHER PUBLICATIONS

International Search Report for International Application PCT/CN2019/081647, dated Jul. 2, 2019.

*Primary Examiner* — Sherrie Hsia
(74) *Attorney, Agent, or Firm* — Burris Law, PLLC (57) ABSTRACT

A light source system comprises: an exciting light source for emitting exciting light; a supplemental light source for emitting supplemental light; a wavelength conversion apparatus for converting the wavelength of part of the exciting light and emitting first light; and a guide apparatus comprising a converging lens and a light combining element. The converging lens is used for adjusting a divergence angle of the first light. The light combining element comprises a first region. The supplemental light focuses on the vicinity of the first region, and the supplemental light and the first light emitted from the converging lens are combined with etendue at the light combining element. Light spots of the first light on a surface of the wavelength conversion apparatus form a magnified image at the light combining element by means of the converging lens.

13 Claims, 5 Drawing Sheets

(58) Field of Classification Search
CPC .......................... G03B 21/204; G03B 21/2066;
G03B 21/208; G03B 21/2046
USPC .................. 348/744, 739; 353/31, 30, 37
See application file for complete search history.

(56) References Cited

U.S. PATENT DOCUMENTS

2020/0285137 A1* 9/2020 Hu ..................... G03B 21/204
2021/0033953 A1* 2/2021 Guo .................... G03B 21/208

FOREIGN PATENT DOCUMENTS

| CN | 105204279 | 12/2015 |
| CN | 106385739 | 2/2017 |
| CN | 205982969 | 2/2017 |
| CN | 107797372 | 3/2018 |
| CN | 207457687 | 6/2018 |
| WO | 2016091106 | 6/2016 |

* cited by examiner

LIGHT SOURCE SYSTEM, METHOD FOR IMPROVING LIGHT EFFICIENCY THEREOF, AND DISPLAY DEVICE

CROSS-REFERENCE TO RELATED APPLICATIONS

This application is a National Phase of International Application No. PCT/CN2019/081647, filed on Apr. 8, 2019, which claims priority to and the benefit of CN 201811020709.2, filed on Sep. 3, 2018. The disclosures of the above applications are incorporated herein by reference.

FIELD

The present disclosure relates to the field of light source, and in particular, to a light source system, a method for improving light efficiency thereof, and a display device.

BACKGROUND

The statements in this section merely provide background information related to the present disclosure and may not constitute prior art.

The projection display industry has focused on brightness and color of a display image during development. However, a red primary color and a green primary color of a common laser fluorescent projection system are red fluorescent light with a wide spectrum and green fluorescent light with a wide spectrum, respectively. It is inevitable to remove a portion of spectral colors that does not meet the requirements in order to expand a color gamut, thereby reducing brightness of a projection image.

The laser fluorescent projection system commonly uses a yellow phosphor to generate red fluorescent light due to light saturation and thermal saturation of a red phosphor. When the red fluorescent light is intercepted from a yellow fluorescent light, a large part of spectral components with a short wavelength cannot be utilized, thereby reducing the light efficiency. Further, in order to achieve white balance and provide a proportion of the red fluorescent light, a green fluorescent light cannot be fully turned on, which results in low light efficiency.

Figure 1:
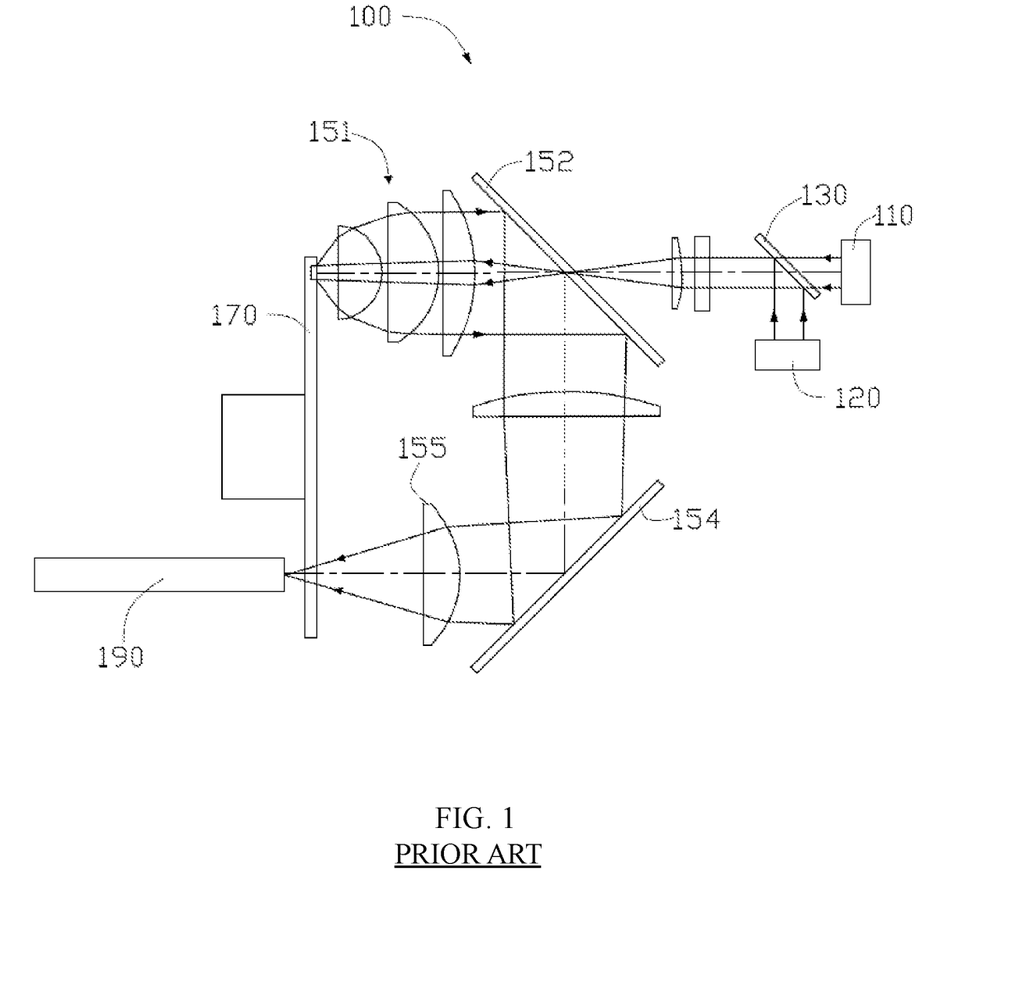
FIG. 1 is a schematic structural view of a light source system in the related art.

A method for adding red laser light and green laser light to a light source of the projection device is currently utilized in order to provide the brightness of the projection image while expanding the color gamut of a projection device. After providing a laser module, the red laser light and the fluorescent light are combined to reach the same color coordinates. In this case, there has more red laser light, the more a cut-off wavelength of a red fluorescent filter shifts towards a short-wave direction, i.e., the higher the brightness of red light is. Therefore, a utilization of the green fluorescent light is higher in a white balance condition, and the brightness of the entire projection system is improved significantly. When a red laser is employed, fluorescent light filtered by a green fluorescent filter during light combination of the green laser light and the green fluorescent light is decreased since green laser light is added, which increases light efficiency. However, when the red laser and the green laser are applied to the projection device it is important that the red laser and the green laser both have a relatively high cost, and the excitation efficiency of the red laser is easily affected by temperature, and photoelectric conversion efficiency of the green laser is relatively low. Meanwhile, it is required to provide a better heat dissipation structure to a red laser light source in order to provide efficiency of the red laser light, which further increases the cost of the red laser light source. At present a structure in which a supplemental light source 120 is additionally provided in a projection device 100 is shown in FIG. 1. Excitation light emitted by an excitation light source 110 and supplemental light emitted by the supplemental light source 120 are combined by a dichroic sheet 130. The supplemental light and the excitation light share an optical path, and pass through a light splitting and combining element 152, a reflective element 154, collection lenses 151 and 155, and a wavelength conversion device 170 into a light homogenizing device 190, respectively. Further, the excitation light and the supplemental light both include laser light. The laser light is incident to a surface of the wavelength conversion device 170 at a reflection efficiency of about 95%. After scattered by the wavelength conversion device 170, the laser light is collected by the collection lenses 151 and 155 at a collection efficiency of about 93%. The laser light passes through the collection lenses 151 and 155 back and forth at a transmittance of about 94%. The collected scattered laser light is lost by 8% to 10% at the light splitting and combining element 152, and is then incident to the light homogenizing device 190 at a coupling efficiency of 90%. Therefore, the utilization of the laser light is only about 68%.

Since the cost is increased due to provide the supplemental light source 120 and the laser light has a low utilization improvement in projection effect of the projection device is not very cost-effective and has low utility.

SUMMARY

This section provides a general summary of the disclosure and is not a comprehensive disclosure of its full scope or all of its features.

The present disclosure provides a light source system in which light emitted from a supplemental light source has a high utilization rate. The present disclosure also provides a method for improving light efficiency of the light source system and a display device.

A light source system includes:

an excitation light source configured to emit excitation light;

a supplemental light source configured to emit supplemental light;

a wavelength conversion device configured to perform wavelength conversion on a part of the excitation light and emit first light; and a guiding device including a convergent lens and a light splitting and combining element, wherein the convergent lens is configured to adjust a divergence angle of the first light, and the light splitting and combining element includes a first region, wherein the supplemental light is converged in the vicinity of the first region, the supplemental light and the first light emitted from the convergent lens are combined with etendue at the light combining element;

wherein a light spot of the first light on a surface of the wavelength conversion device forms a magnified image at the light combining element via the convergent lens.

A display device includes the light source system as described above.

A method for improving light efficiency of a light source system includes steps of:

providing excitation light;

providing supplemental light;

performing, by a wavelength conversion device, wavelength conversion on a part of the excitation light incident to the wavelength conversion device, and emitting first light by the wavelength conversion device;

converging the supplemental light in the vicinity of a first region of a light combining element;

combining, by the light combining element, the supplemental light and the first light with etendue; and forming, by a convergent lens, a magnified image of a light spot of the first light on an surface of the wavelength conversion device at the light combining element.

In the light source system, the display device and the method for improving the light efficiency of the light source system according to some forms of the present disclosure, the light spot of the first light on the surface of the wavelength conversion device forms the magnified image at the light splitting and combining element via the convergent lens, which is beneficial to improve the light efficiency of the light source system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

In order to more clearly describe technical solutions of the forms/implementations of the present disclosure, accompanying drawings described in the description of the forms/implementations will be briefly introduced hereinafter. It is apparent that the accompanying drawings in the following description are some forms/implementations of the present disclosure. Other drawings may be obtained based on these drawings by those skilled in the art without any inventive step.

| Reference Signs List | |
|---|---|
| light source system | 100, 200, 300 |
| excitation light source | 110 |
| supplemental light source | 120, 220, 320 |
| dichroic sheet | 130 |
| guiding device | 250 |
| collection lens | 151, 155, 251 |
| guiding element | 252 |
| convergent lens | 253, 353 |
| light splitting and combining element | 152 |
| reflective element | 154 |
| light combining element | 254, 354 |
| first region | 254a |
| second region | 254b |
| intermediate image | A |
| relay lens | 255, 355 |
| wavelength conversion device | 170, 270, 370 |
| conversion region | 271 |
| light spot | s, t |
| light filter region | 275 |
| light homogenizing device | 190, 290, 390 |

The present disclosure will be further illustrated by the following specific forms in conjunction with the above accompanying drawings.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to understand the above objections, features and advantages of the present disclosure more clearly, the present disclosure will be described in detail below with reference to the accompanying drawings and specific forms. It should be noted that the forms of the present disclosure and the features thereof may be combined with each other without confliction.

In the following description, many specific details are set forth in order to provide a thorough understanding of the present disclosure. The forms described below are merely some of, rather than all of, the forms of the present disclosure. In view of the forms of the present disclosure, all other forms made by those skilled in the art without any inventive step shall be fallen within the scope of the present disclosure.

All technical and scientific terms used herein have the same meaning as commonly understood by those skilled in the art, unless otherwise stated. The terms used in the description of the present disclosure are merely for the purpose of describing the specific forms, but are not intended to limit the present disclosure.

Figure 2:
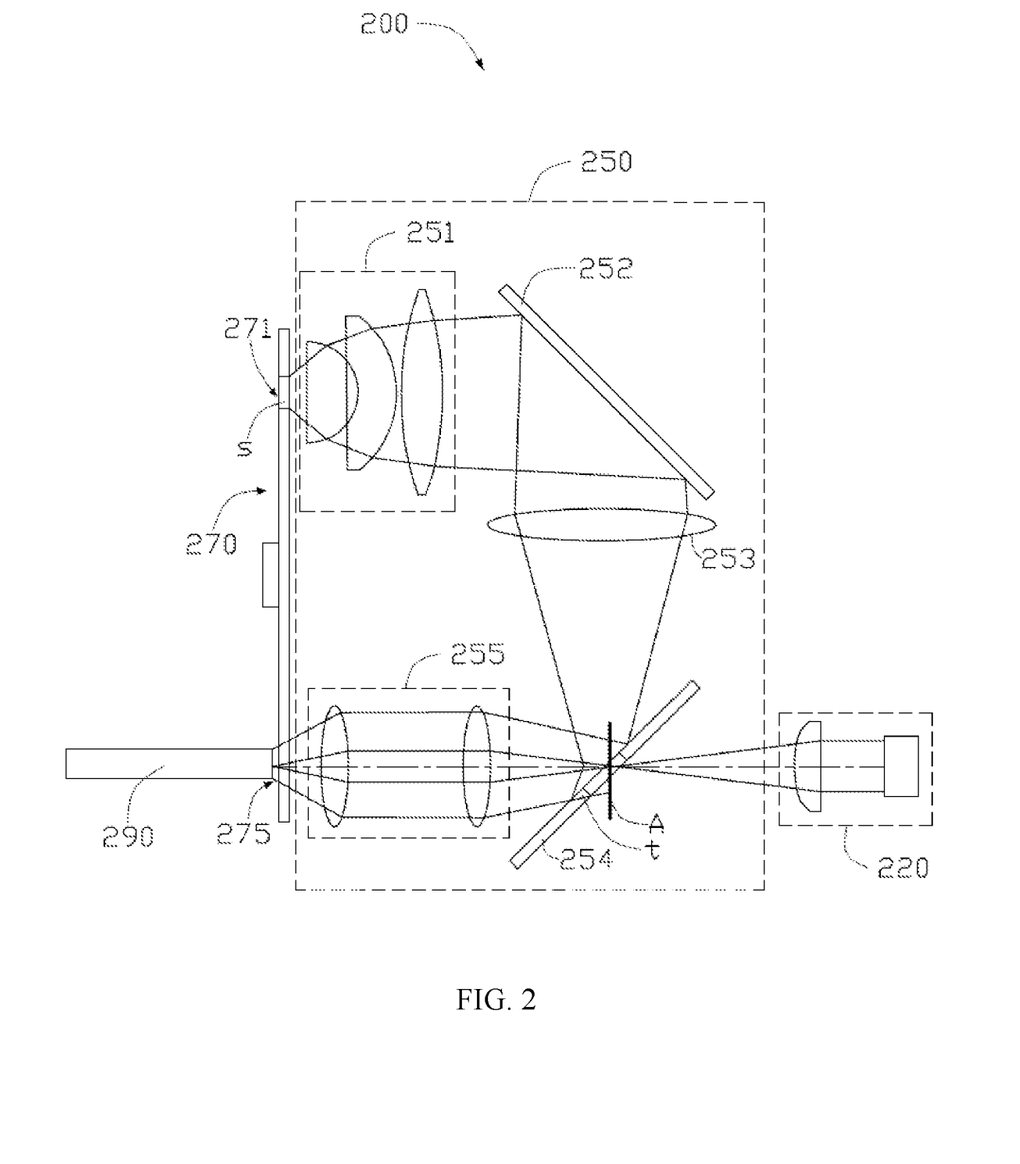
FIG. 2 is a schematic structural view of a light source system according to a first form of the present disclosure.

Referring to FIG. 2, it is a schematic structural view of a light source system 200 according to a first embodiment of the present disclosure. The light source system 200 according to some forms of the present disclosure may be applied to a display device such as a laser fluorescent projection device. The light source system 200 includes an excitation light source (not shown), a supplemental light source 220, a guiding device 250, and a wavelength conversion device 270. Further, excitation light emitted by the excitation light source is configured to be guided by the guiding device 250, so as to be irradiated to the wavelength conversion device 270. The wavelength conversion device 270 is configured to perform wavelength conversion on the excitation light, so that first light is emitted from the wavelength conversion device 270 and a light spot of the first light is formed on a surface of the wavelength conversion device 270. The supplemental light source 220 is configured to emit supplemental light including laser light. The supplemental light and the first light are combined with etendue through guiding by the guiding device 250 and then emitted from the guiding device 250. Furthermore, light source light emitted from the light source system 200 includes the first light and the supplemental light. The first light includes fluorescent light, which is configured to modulate an image in a first color gamut. The supplemental light includes the laser light, which is configured to modulate an image in a second color gamut. The second color gamut is configured to cover the first color gamut, and the second color gamut has a portion beyond the first color gamut. Therefore, the light source system 200 with the supplemental light source 220 can effectively expand the color gamut coverage of the image modulated by the light source light, which is beneficial to improve quality of an image displayed on the display device employing the light source system 200.

The excitation light source is not shown in FIG. 2. In one form, the wavelength conversion device 270 is a reflective color wheel, and the excitation light source is arranged at a side of the guiding device 250 facing away from the wavelength conversion device 270. It should be understood that the wavelength conversion device 270 may also be a transmissive color wheel, and the excitation light source may be arranged at a side of the wavelength conversion device 270 facing away from the guiding device 250 accordingly.

In this form, the excitation light source is a blue light source suitable to emit blue excitation light. As appreciated, the excitation light source may also be a violet light source or an ultraviolet light source suitable to emit violet light or ultraviolet light as the excitation light to excite the wavelength conversion device 270 to emit the first light of a longer wavelength, which includes light of three primary colors. A luminous body of the excitation light source may be a laser or a light-emitting diode, and a number of luminous bodies may be freely selected as required.

The supplemental light source 220 is configured to emit the supplemental light including the laser light. The supplemental light source 220 may emit red laser light and/or green laser light as the supplemental light. Accordingly, the supplemental light source 220 may include a red laser and/or a green laser. When the supplemental light source 220 includes a plurality of lasers, the supplemental light source 220 may be additionally provided with reflective elements for compressing the light spot, such as a reflective strip and a mirror.

The excitation light source and the supplemental light source 220 may be provided with a light homogenizing device, such as an optical integrator rod or a fly-eye lens, to homogenize the emitted excitation light and the emitted supplemental light. However, the light homogenizing device of the excitation light source and the supplemental light source 220 may be omitted, especially in a miniaturized light source system.

The wavelength conversion device 270 includes a circular substrate, and a conversion region 271 and a light filter region 275 arranged at a surface of the substrate. Further, the conversion region 271 and the light filter region 275 are in annular shapes with unequal inner diameters. The light filter region 275 is arranged at an edge of the substrate, and the conversion region 271 is arranged along an inner circumference of the light filter region 275. Alternatively, the conversion region 271 and the light filter region 275 may be interchanged in position. The conversion region 271 may be arranged to be spaced apart from or adjacent to the light filter region 275.

Further, the conversion region 271 includes a plurality of color segments, such as a blue segment, a red segment, and a green segment. In this form embodiment, the circular wavelength conversion device 270 is driven by a driving device to periodically rotate, and thus the blue segment, the red segment and the green segment are periodically positioned on an optical path of the excitation light. Furthermore, the blue segment corresponding to the blue excitation light is provided with a scattering layer, which is formed of a scattering powder to scatter the excitation light to change angular distribution of the excitation light. Other color segments are provided with phosphors of corresponding colors. For example, the red segment is provided with a red phosphor, and the green segment is provided with a green phosphor, to respectively perform the wavelength conversion on the blue excitation light and generate red fluorescent light and green fluorescent light. The excitation light is periodically irradiated to each color segment of the conversion region 271. The first light generated by the excitation light is formed into a light spot s on the surface of the wavelength conversion device 270, which periodically moves in each color segment. The first light emitted from the conversion region 271 includes the red fluorescent light, the green fluorescent light, and the scattered blue excitation light. Light of three primary colors in the first light are combined in sequence to obtain white light.

In some forms, the conversion region 271 may include a yellow segment and a blue segment. Further, the yellow segment may be provided with a yellow phosphor, the blue segment may be provided with a scattering layer for scattering the excitation light, and yellow fluorescent light emitted from the yellow segment and the scattered excitation light emitted from the blue segment are combined to obtain the white light. In a modified form, the conversion region 271 includes the red segment, the green segment, the yellow segment, and the blue segment. Alternatively, the red segment of the conversion region 271 may be replaced by an orange segment. The conversion region 271 may also be implemented in other manners, which are not limited to the above listed examples.

The light filter region 275 includes color segments corresponding to the color segments of the conversion region 271 one to one. In this form, the light filter region 275 includes a blue segment, a red segment and a green segment, and each color segment is provided with a filter of corresponding color. The light filter region 275 is driven by the driving device to be rotated along with the conversion region 271 synchronously. The first light emitted from the conversion region 271 in sequence is guided by the guiding device 250 and then travels through the corresponding color segment of the light filter region 275 to be emitted from the wavelength conversion device 270, thereby intercepting a part of the first light to improve purity of the emitted first light.

As shown in FIG. 2, the light homogenizing device 290 and the guiding device 250 are arranged at opposite sides of the wavelength conversion device 270, respectively. The first light emitted from the light filter region 275 of the wavelength conversion device 270 and the emitted supplemental light guided by the guiding device 250 are homogenized by the light homogenizing device 290 to emit light source light with uniform color and brightness. The light homogenizing device 290 may be an optical integrator rod or a fly-eye lens.

Further, the guiding device 250 may include a collection lens 251, a guiding element 252, a convergent lens 253, a light combining element 254 and a relay lens 255. The first light emitted from the conversion region 271 sequentially travels through the collection lens 251, the guiding element 252, the convergent lens 253, the light combining element 254 and the relay lens 255, and then is incident to the light filter region 275. The supplemental light emitted from the supplemental light source 220 sequentially travels through the light combining element 254 and the relay lens 255, and then is incident to the light filter region 275. The first light and the supplemental light are combined with etendue at the light combining element 254.

The collection lens 251 is composed of a plurality of lenses with overlapped optical axes, and the plurality of lenses have different focal lengths. The closer the lens relative to the wavelength conversion device 270 is, the shorter the focal length of the lens is. The collection lens is configured to collect and collimate the first light in Lambertian distribution emitted from the conversion region 271 to emit substantially parallel first light.

The type of the guiding element 252 varies based on a position of the excitation light source. In a form where the excitation light source is arranged at the side of the guiding device 250 facing away from the wavelength conversion device 270, the guiding element 252 is a light splitting and combining element of which a region is coated with a film. In a form where the excitation light source is arranged at the side of the wavelength conversion device 270 facing away from the guiding device 250, the guiding element 252 is a mirror for reflecting the first light.

The convergent lens 253 is configured to converge the first light emitted from the guiding element 252 to the light combining element 254. Images of the light spot s of the first light on the wavelength conversion device 270 can be formed on any of receiving surfaces on a light path of the first light emitted from the convergent lens 253. The images of the light spot s include an intermediate image A with the highest imaging definition, and the remaining images have a lower definition than the intermediate image A. Further, the intermediate image A is imaged at a position corresponding to a portion of the convergent lens 253, from which a light beam of the first light with a minimum diameter is emitted. In other words, the intermediate image A is formed at a position where the light beam of the first light emitted from the convergent lens 253 has the minimum diameter, and the definition of the intermediate image is higher than other images.

The light efficiency of the first light is related to a light combining process of the first light and the supplemental light, and the first light and the supplemental light are combined based on an etendue principle. The supplemental light emitted by the supplemental light source 220 is the laser light and has a low etendue. The reflective elements and the lenses on an optical path inside the supplemental light source 220 have less effect on the etendue. Meanwhile, an optical path of the supplemental light between the supplemental light source 220 and the guiding device 250 is provided with a scattering element (not shown) to reduce speckle of the supplemental light and eliminate unevenness due to discontinuity of the angular distribution of the supplemental light. Since the speckle is greatly reduced due to the light combining process of the supplemental light and the first light, a scattering angle of the scattering element is small, which can provide that the etendue of the supplemental light incident to the light combining element 254 is kept to be relatively low. The first light is generated through excitation the phosphor by the excitation light, and a light-emitting process of the phosphor is Lambertian scattering, so that an etendue of the first light is very high.

Figure 3:
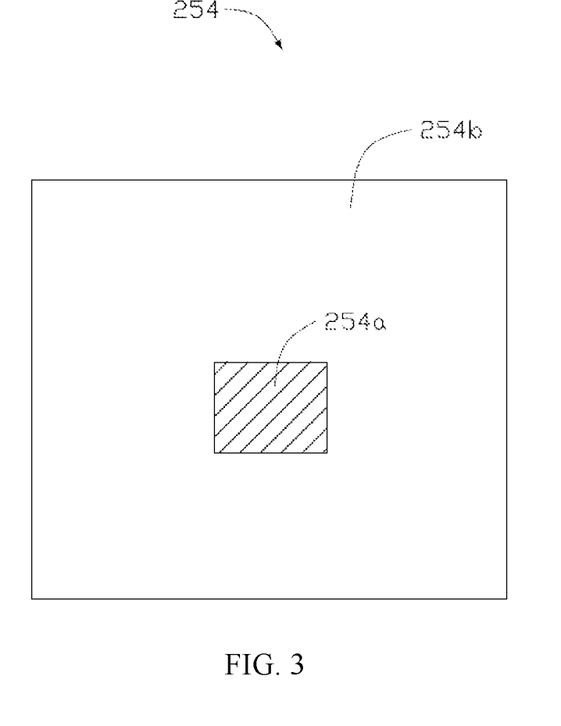
FIG. 3 is a schematic structural view of a light splitting and combining element shown in FIG. 2.

Referring to FIG. 3, it shows a schematic structural view of the light-combining element 254 shown in FIG. 2. The light-combining element 254 is configured to guide the first light emitted from the convergent lens 253 and the supplemental light emitted from the supplemental light source 220 to be combined with etendue. Specifically, the light combining element 254 has a surface that includes a first region 254a and a second region 254b. The second region 254b is arranged on a periphery of the first region 254a. In some forms of the present disclosure, a specific position of the first region 254a on the surface of the light-combining element 254 is not limited herein. The first region 254a may be located at a geometric center of the surface of the light-combining element 254. Alternatively, the first region 254a may be arranged at an eccentric position on the surface of the light-combining element 254.

The supplemental light is configured to be converged in the vicinity of the first region 254a, and the first light is irradiated to the first region 254a and the second region 254b. The first region 254a is plated with an antireflective film to transmit the supplemental light, and the second region 254b is plated with a reflective film to reflect the first light. A light beam of the first light irradiated to the first region 254a is transmitted through the first region 254a and is unable to be received by the relay lens 255, which causes a part of luminous energy to be lost. Since the supplemental light and the first light are significantly different from each other in the etendue, a spot area of the supplemental light is significantly different from that of the first light in the case that they have the substantially same light beam angle. Therefore, although the supplemental light is partially overlapped with the first light in the spectrum, less loss of the first light can be still be provided during the light combining process.

Since the optical path of the supplemental light does not pass through the conversion region 271 of the wavelength conversion device 270, the supplemental light is efficiently utilized. Further, the supplemental light travels through the reflective elements and the lenses on the optical path inside the supplemental light source 220 at a reflectance and a transmittance of about 99%, a coupling efficiency at the light combining element 254 is about 97%, and a coupling efficiency at an entrance of the light homogenizing device 290 is about 90%. Therefore, a total utilization rate of the supplemental light is about 80%, which is increased by about 18% in comparison with a method for adding the supplemental light source 120 in the existing light source system 100.

Since the fluorescent light of 8%-10% is lost in the first region 254a during the light combining process of the supplemental light and the first light at the light combining element 254, an overall light efficiency may be lost by a predetermined amount. In order to improve the light efficiency, a polarized light splitting film or a polarized light splitting sheet is arranged in the first region 254a to transmit light in a first polarization state and reflect light in a second polarization state, wherein the supplemental light is the light in the first polarization state. In some forms, the supplemental light is p-polarized light, and has p-light of up to 95% or more after traveling through the scattering element. The first light is non-polarized light. In addition, the p-light is transmitted in the first region 254a, and s-light is reflected in the first region 254a. In this form, the loss of the first light is reduced by half. That is, the loss of the first light in the first region 254a becomes 4%-5%, and the loss of the supplemental light is about 5% that is increased by 2%. However, the overall light efficiency may be increased since a proportion of the first light is greater than that of the supplemental light.

The etendue is actually an integral of an area of a cross section, through which the light travels, and a solid angle of a space occupied by the light. Since light beam angles of the first light and the supplemental light are substantially the same during the light combining process with etendue, a loss proportion of the first light may be approximately determined by a relative size of the light spot of the first light spot at the light combining element 254 to the first region 254a. In order to further improve the light efficiency of the first light of the light source system 200, parameters of the convergent lens 253 are adjusted in this form, so that the intermediate image A of the light spot of the laser light on the surface of the wavelength conversion device 270 is formed into a magnified image, which is beneficial to increase an area of the light spot of the first light on the light combining element 254. The magnified image has an increased area relative to an original image. It may also be understood that a position of the magnified image is a defocus position of the light. Therefore, a loss ratio P (%) of the first light is approximately calculated by a formula:

$$P(\%)=S1/S2,$$

wherein S1 is an area of the first region 254a of the light combining element 254, and S2 is an area of a light spot t of the first light at the light combining element 254. Therefore, the larger the light spot of the first light formed on the surface of the light combining element 254 is, or the larger the image formed on the surface of the light combining element 254 is, the less the loss ratio of the first light is. In this case, the utilization rate of the supplemental light is not reduced, thereby improving the light efficiency of the first light.

Referring to FIG. 2 again, in this form, the intermediate image A of the light spot s is located at the light combining element 254, so that the first light is formed into the intermediate image A and the light spot t with the smallest area on the surface of the light combining element 254. In other forms, the intermediate image A is located beyond the light combining element 254, the light beam of the first light irradiated to the surface of the light combining element 254 has a relatively large diameter, and a formed light spot t is larger than the light spot t in this form.

The intermediate image A of the light spot of the excitation light on the surface of the wavelength conversion device 270 is formed at the light combining element 254. The parameters of the convergent lens 253, such as a radius of curvature and a position of the convergent lens 253 relative to other devices, are adjustable. The intermediate image A is formed into the magnified image by adjusting the parameters of the convergent lens 253. That is, an area of the intermediate image A is larger than that of the light spot s, so that the light spot s forms the magnified image and is formed into the magnified light spot t at the light combining element 254, which is beneficial to further reduce the loss of the first light at the light combining element 254. In addition, the utilization rate of the supplemental light is not reduced, thereby facilitating improvement in the light efficiency of the light source system 200.

In addition, as shown in FIG. 2, the first light and the supplemental light emitted from the light combining element 254 are incident to the relay lens 255 at the same divergence angle. The relay lens 255 includes a plurality of lenses, of which radii of curvature and positions are adjustable. The intermediate image A is imaged at the entrance of the light homogenizing device 290 by adjusting the relay lens 255, and the first light and the supplemental light are incident to the light homogenizing device 290 at the same divergence angle, which facilitates multiple reflections of the first light and the supplemental light within the light homogenizing device 290, thereby improving uniformity of the emitted light beam.

In this form, there is further provided a method for improving light efficiency of a light source system 200, which includes steps of:

S1: providing excitation light. Specifically, the method is applied to the light source system 200. An excitation light source is configured to provide excitation light to excite a wavelength conversion device. The excitation light may be a blue light, a violet light, or an ultraviolet light, to excite red fluorescent light, green fluorescent light, yellow fluorescent light, orange fluorescent light or fluorescent light of other color, which has a relatively long wavelength.

S2: providing supplemental light. In some forms of the present disclosure, a supplemental light source 220 may be configured to emit the supplemental light including laser light. The supplemental light may be at least one of red laser light, blue laser light, green laser light, or laser light of other color.

S3: performing, by a wavelength conversion device 270, wavelength conversion on a part of the excitation light incident to the wavelength conversion device, and emitting first light by the wavelength conversion device. The wavelength conversion device 270 is provided with a wavelength conversion material on a surface thereof to convert at least part of the excitation light into fluorescent light. In the present disclosure, the surface of the wavelength conversion device 270 is further provided with a scattering layer for scattering the excitation light. The first light emitted from the wavelength conversion device 270 includes the fluorescent light and the scattered excitation light.

S4: converging the supplemental light in the vicinity of a first region 254a of a light combining element 254. The supplemental light may be converged generally by a lens or other device, such as a reflective element.

S5: combining, by the light combining element 254, the supplemental light and the first light with etendue. The supplemental light is converged in the vicinity of the first region 254a. The first light includes the fluorescent light, and an etendue of the fluorescent light is greater than that of the supplemental light. The first light is irradiated to the first region 254a and a second region 254b of the light combining element 254. Specifically, the first region 254a is configured to transmit the light, and the second region 254b is configured to reflect the light. In some forms of the disclosure, the first region 254a is provided with an antireflective film or the first region 254a is a hollow region, and the second region 254b is configured to reflect the light.

S6: forming, by a convergent lens 253, a magnified image of a light spot s of the first light on the surface of the wavelength conversion device 270 at the light combining element.

Specifically, a radius of curvature of the convergent lens 253 and/or a position of the convergent lens 256 in the light source system 200 is adjusted to obtain at least a set of parameters of the convergent lenses 253. Thus, the magnified image can be formed on the light combining element 254, such that the light spot s forms the magnified image at the light combining element 254.

In this form, the light spot s forms a magnified intermediate image at the light combining element 254 with the convergent lens 253. The intermediate image is an image corresponding to a position where the light emitted from the convergent lens 253 has a minimum diameter. If the intermediate image is the magnified image, that is, an area of the intermediate image is larger than that of the light spot s, which is beneficial to improve the light efficiency of the light source system 200.

It should be understood that the method further includes a step S7 for adjusting uniformity of an emitted light source light after the step S6.

S7: homogenizing the light emitted from the light combining element with a light homogenizing device 290.

S8: providing a relay lens 255 to relay the light emitted from the light combining element 254 to an entrance of the light homogenizing device 290, thereby facilitating decrease in color unevenness of an image displayed on a display device.

It should be understood that corresponding steps may be added to or removed from the above steps as desired or the sequence between the steps is variable.

Figure 4:
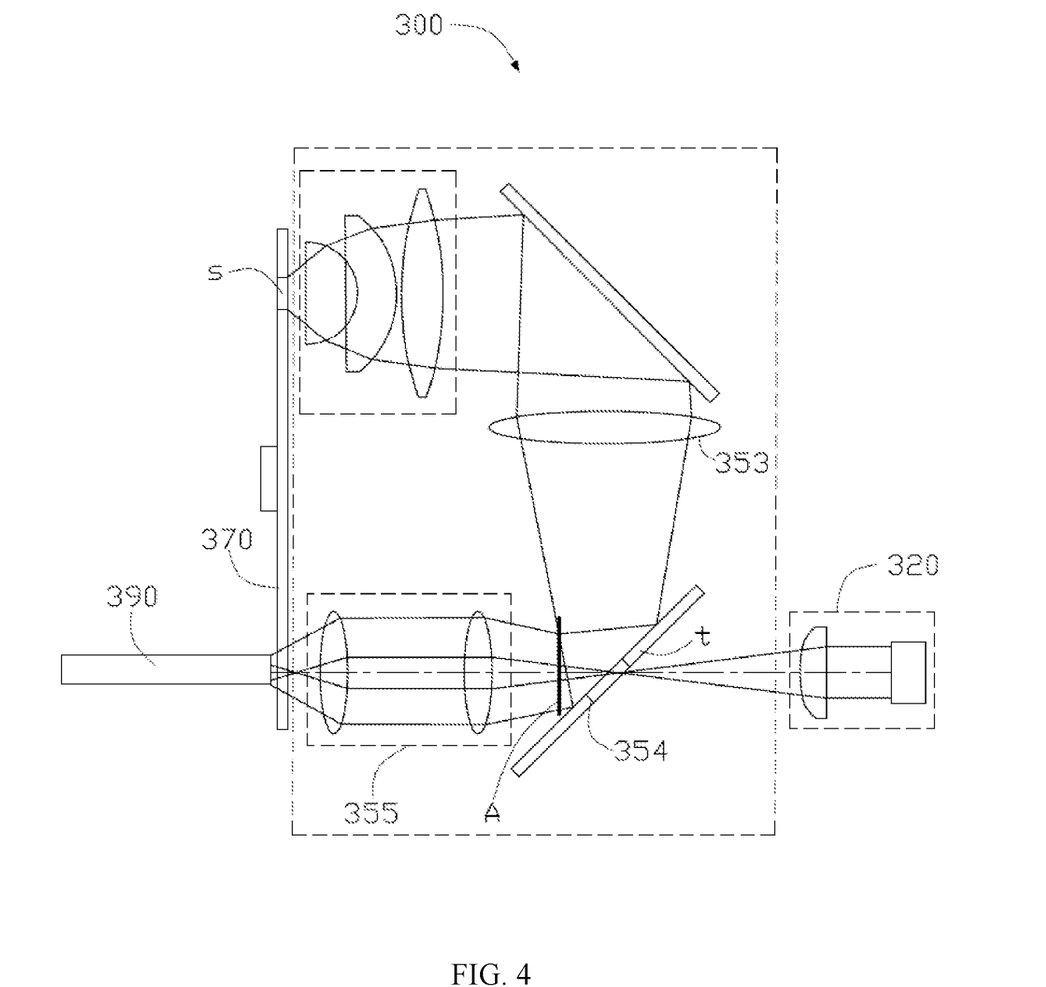
FIG. 4 is a schematic structural view of a light source system according to a second form of the present disclosure.
Figure 5:
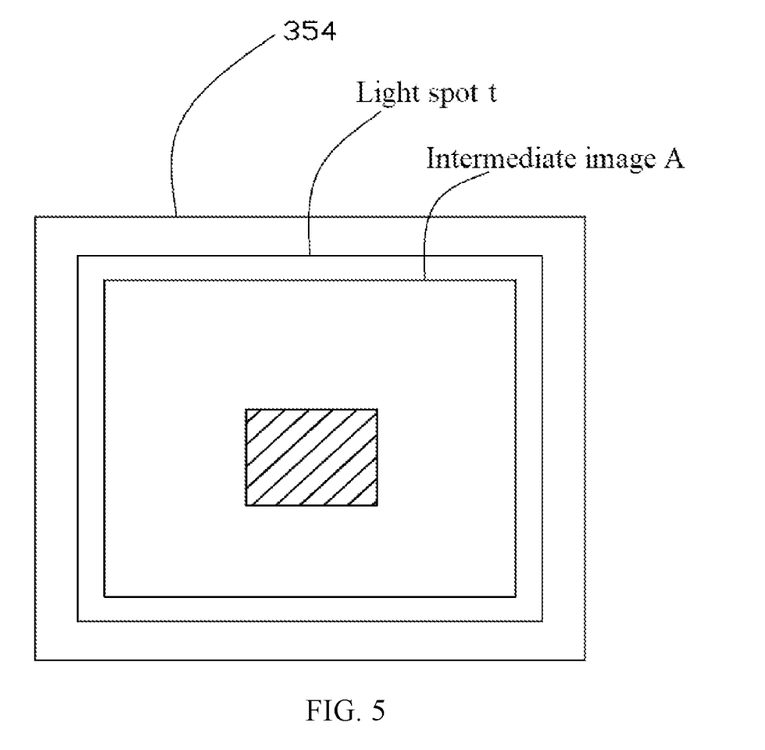
FIG. 5 is a schematic view showing a size comparison between an intermediate image, a light spot of first light on a light splitting and combining element, and a surface of the light splitting and combining element.

Referring to FIGS. 4 and 5, FIG. 4 shows a schematic structural view of a light source system 300 according to a second form of the present disclosure, and FIG. 5 shows a schematic view that illustrates a size comparison between an intermediate image A, a light spot t of first light on a light combining element 354, and a surface of the light combining element 354.

In the light source system 300 according to this form, the intermediate image A of an light spot of excitation light on a wavelength conversion device 370 is located between the light combining element 354 and a relay lens 355 to form a magnified image on the surface of the light combining element 354, such that an area of the light spot t of the first light at the light combining element 354 can be increased and the intermediate image A can be imaged at an entrance of a light homogenizing device 390.

Since an etendue of the first light is not zero, that is, a light beam of the first light has a predetermined divergence angle, the light spot s of the first light on the wavelength conversion device 370 passes through the convergent lens 353, and then forms the intermediate image A located at a side of the light combining element 354 facing away from the convergent lens 353. Since a position of the intermediate image A corresponds to a position where the light beam of the first light emitted from the convergent lens 353 has a minimum diameter, the light beam of the first light corresponding to the light spot t of the first light on the light combining element 354 has a larger diameter than that of the light beam of the first light corresponding to the intermediate image A, such that the area of the light spot t of the first light on the surface of the light combining element 354 is greater than that of the intermediate image A. Therefore, the area of the light spot of the first light on the light combining element 354 is increased, which is beneficial to improve the utilization rate of the first light and the light efficiency of the light source system 300.

The intermediate image A of the light spot of the excitation light is imaged to an entrance of an optical integrator rod 390 with the relay lens 355, and supplemental light is converged to the first region of the light combining element 354. Since the intermediate image A is not located on the light combining element 354, i.e., the intermediate image A is slightly defocused from a focus position of the supplemental light, an etendue of the supplemental light at the entrance of the light homogenizing device 390 becomes larger, and a light homogenizing effect of the light homogenizing device 390 is enhanced. In addition, the first light and the supplemental light are incident to the light homogenizing device at the same divergence angle, which further reduces color unevenness of the image displayed on the display device.

In this form, the steps of the method for improving the light efficiency of the light source system 300 are different from the method for improving the light efficiency of the light source system 200 in that a step S6 specifically includes providing the convergent lens 354 to form the intermediate image with the light spot s between the light combining element 354 and the relay lens 355.

Specifically, a predetermined imaging position of the intermediate image A between the light combining element 354 and the relay lens 355 is determined based on a predetermined light loss ratio of the first light, and then the convergent lens 353 is adjusted such that the light spot s is imaged at the predetermined imaging position.

It should be noted that, the specific solutions applicable to the first form and the second form may also be applicable to each other within the scope of the spirit and desired features of the present disclosure, and detailed description thereof is omitted for brevity and avoiding redundancy.

It is obvious for those skilled in the art that the present disclosure is not limited to the details of the exemplary forms as described above, and the present disclosure can be implemented in other specific forms without departing from the spirit or desired features of the present disclosure. Therefore, the forms should be regarded as exemplary and non-limiting. The scope of the present disclosure is defined by the appended claims, rather than the description as described above. Therefore, it is intended that all the modifications and/or changes within the meaning and scope of the equivalent elements in the claims shall be fallen within the present disclosure. Any one of reference numerals in the claims should not be regarded as limiting the claims. In addition, it is obvious that the word such as "including" or "comprising" does not exclude other units or steps, and a singular does not exclude a plural. A plurality of devices recited in the claims of a device may also be implemented through software or hardware by the same device or system. Words such as "first" and "second" are used to denote names, rather than denoting any specific order.

Finally, it should be noted that the above forms are merely used to illustrate the technical solutions of the present disclosure and not to limit the present disclosure. Although the present disclosure has been described in detail with reference to some forms, it should be understood by those skilled in the art that modifications or equivalent replacements can be made to the technical solutions of the present disclosure without departing from the spirit and scope thereof.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A light source system, comprising:
   an excitation light source configured to emit excitation light;

a supplemental light source configured to emit supplemental light;

a wavelength conversion device configured to perform wavelength conversion on a part of the excitation light and emit first light; and a guiding device comprising a convergent lens and a light combining element, wherein the convergent lens is configured to adjust a divergence angle of the first light, the light combining element comprises a first region, wherein the supplemental light is converged in a vicinity of the first region, the supplemental light and the first light emitted from the convergent lens are combined with etendue at the light combining element, and wherein a light spot of the first light on a surface of the wavelength conversion device forms a magnified image at the light combining element via the convergent lens.

2. The light source system according to claim 1, wherein the light spot passes through the convergent lens, and then forms an intermediate image that is located at the light combining element; and light emitted from the light combining element travels through a relay lens and is then emitted from the relay lens.

3. The light source system according to claim 2, wherein the intermediate image is located in the first region.

4. The light source system according to claim 2, further comprising:

a light homogenizing device configured to homogenize light emitted from the guiding device, wherein the relay lens is configured to image the intermediate image at an entrance of the light homogenizing device.

5. The light source system according to claim 4, wherein the first light and the supplemental light are incident to the light homogenizing device at a same divergence angle.

6. The light source system according to claim 1, further comprising:

a relay lens configured to receive light emitted from the light combining element, wherein the light spot passes through the convergent lens and then forms an intermediate image, and the intermediate image is located between the light combining element and the relay lens.

7. The light source system according to claim 1, wherein a polarized light splitting film or a polarized light splitting sheet is arranged in the first region.

8. The light source system according to claim 1, wherein the guiding device further comprises a collection lens adjacent to the wavelength conversion device, and the collection lens is configured to collimate the first light emitted from the wavelength conversion device in such a manner that the collimated first light is incident to the convergent lens.

9. The light source system according to claim 1, wherein a radius of curvature of the convergent lens and a position of the convergent lens in the light source system are adjustable, and the light spot of the first light on the surface of the wavelength conversion device forms the magnified image at the light combining element via the convergent lens by adjusting at least one of the radius of curvature of the convergent lens or the position of the convergent lens in the light source system.

10. A display device, comprising a light source system, wherein the light source system comprises:

an excitation light source configured to emit excitation light;

a supplemental light source configured to emit supplemental light;

a wavelength conversion device configured to perform wavelength conversion on a part of the excitation light and emit first light; and a guiding device comprising a convergent lens and a light combining element, wherein the convergent lens is configured to adjust a divergence angle of the first light, the light combining element comprises a first region, wherein the supplemental light is converged in a vicinity of the first region, the supplemental light and the first light emitted from the convergent lens are combined with etendue at the light combining element, and wherein a light spot of the first light on a surface of the wavelength conversion device forms a magnified image at the light combining element via the convergent lens.

11. A method for improving light efficiency of a light source system, comprising steps of:

providing excitation light;

providing supplemental light;

performing, by a wavelength conversion device, wavelength conversion on a part of the excitation light incident to the wavelength conversion device, and emitting first light by the wavelength conversion device;

converging the supplemental light in a vicinity of a first region of a light combining element;

combining, by the light combining element, the supplemental light and the first light with etendue; and forming, by a convergent lens, a magnified image of a light spot of the first light on an surface of the wavelength conversion device at the light combining element.

12. The method for improving the light efficiency of the light source system according to claim 11, wherein said forming, by the convergent lens, the magnified image of the light spot of the first light on the surface of the wavelength conversion device at the light combining element comprises:

adjusting at least one of a radius of curvature of the convergent lens or a position of the convergent lens in the light source system in such a manner that the light spot forms the magnified image at the light combining element.

13. The method for improving the light efficiency of the light source system according to claim 11, further comprising:

receiving, by a relay lens, light emitted from the light combining element, wherein said forming, by the convergent lens, the magnified image of the light spot of the first light on the surface of the wavelength conversion device at the light combining element comprises:

forming, by the convergent lens, a magnified intermediate image of the light spot between the light combining element and the relay lens.

* * * * *